United States Patent [19]
Yamada et al.

[11] Patent Number: 4,833,212

[45] Date of Patent: May 23, 1989

[54] FLUORINE-CONTAINING ELASTOMER COMPOSITION

[75] Inventors: Okimasa Yamada; Tetsuya Mizuno; Takehiro Sonoi; Toshimasa Sagawa, all of Kitaibaraki, Japan

[73] Assignee: Nippon Mektron Limited, Japan

[21] Appl. No.: 163,621

[22] Filed: Feb. 4, 1988

[30] Foreign Application Priority Data

Mar. 13, 1987 [JP] Japan .................................. 62-58146

[51] Int. Cl.$^4$ ................................................ C08F 8/42
[52] U.S. Cl. ........................... 525/359.2; 525/326.2; 525/326.3; 525/326.4; 525/366; 525/368; 525/370
[58] Field of Search ..................... 525/359.2, 366, 368, 525/370

[56] References Cited

U.S. PATENT DOCUMENTS

| | | | |
|---|---|---|---|
| 3,931,124 | 1/1976 | Kometani et al. | 525/326.3 |
| 4,250,278 | 2/1981 | Suzuki et al. | 525/326.3 |
| 4,529,759 | 7/1985 | Ojakaar | 525/326.3 |
| 4,734,460 | 3/1988 | Yamada | 525/326.3 |

*Primary Examiner*—Joseph L. Schofer
*Assistant Examiner*—Bernard Lipman
*Attorney, Agent, or Firm*—Fred Philpitt

[57] ABSTRACT

A fluorine-containing elastomer composition which comprises (a) a fluorine-containing elastomer, (b) at least one of divalent metal oxide and hydroxide, (c) a polyhydroxyaromatic compound and (d) a complex compound of 1,8-diazobicyclo[5,4,0]undec-7-ene or diazabicyclo[4,3,0]non-5-ene and a divalent metal chloride, has a good stock storage stability and can produce a vulcanized product with improved vulcanized product properties and compression set.

8 Claims, No Drawings

FLUORINE-CONTAINING ELASTOMER COMPOSITION

BACKGROUND OF THE INVENTION

1. Field of the Invention

This invention relates to a fluorine-containing elastomer composition, and more particularly to a fluorine-containing elastomer composition having a good stock storage stability and capable of producing a vulcanized product with improved vulcanized product properties and compression set.

2. Description of the Prior Art

The vulcanized product of fluorine-containing elastomer have useful characteristics in heat resistance at an elevated temperature, chemical resistance, oil resistance, weathering resistance, etc. and has been in rapidly increasing need in the form of sealing materials such as gaskets, O-rings, packings, etc. or hoses, sheets, etc. in the automobile industry, the oil hydraulic industry, the general machinery industry, the aviation industry, etc. In other words, the needs for the vulcanized product of fluorine containing elastomer have been diversified and have become strict in addition to the need for making the molding and processing steps more efficient.

Vulcanization of the fluorine-containing elastomer was initially carried out with polyamine-based derivatives such as hexamethylenediamine carbamate or methylenebis (cyclohexyl) amine carbamate, but these vulcanization systems had such disadvantages as poor scorch resistance (processing stability and storage stability) or poor compression set of vulcanized product. Thereafter, a process for crosslinking with a polyhydroxyaromatic compound in the presence of a vulcanization promoter and an acid receptor was proposed as a vulcanization system capable of improving these disadvantages and has been commercially utilized up to now.

The vulcanization promoter for use in the vulcanization system includes a quaternary phosphonium salt compound [Japanese Patent Application Kokai (Laid-open) No. 47-191], a quaternary ammonium salt compound [Japanese Patent Publication No. 52-38072 and Japanese Patent Application Kokai (Laid-open) No. 47-3831], a quaternary ammonium salt compound of 8-alkyl (or aralkyl)-1,8-diazabicyclo [5,4,0]undec-7-ene [Japanese Patent Publication No. 52-8863 and Japanese Patent Application Kokai (Laid-open) No. 48-55231], a combination thereof with such an amount of 1,8-diazabicyclo [5,4,0] undec-7-ene as not to substantially vulcanize the fluorine-containing elastomer (Japanese Patent Publication No. 57-20333), etc.

Even with these vulcanization systems, the compression set of vulcanized products is not at a thoroughly satisfactory level particularly at an elevated temperature and also the stock storage stability is not satisfactory.

As a result of extensive researches for fluorine-containing elastomer compositions having a stock storage stability and capable of producing a vulcanized product with improved vulcanized product properties and compression set, the present inventors have found that such a problem can be effectively solved by using a divalent metal amine complex compound represented by the following general formula [I] as a component of the composition.

SUMMARY OF THE INVENTION

An object of the present invention is to provide a fluorine-containing elastomer composition having a good stock storage stability.

Another object of the present invention is to provide a fluorine-containing elastomer composition capable of producing a vulcanized product with improved vulcanized product properties and compression set.

DETAILED DESCRIPTION OF THE PREFERRED EMBODIMENTS

The present fluorine-containing elastomer composition comprises (a) a fluorine-containing elastomer, (b) at least one of divalent metal oxide and hydroxide, (c) a polyhydroxy-aromatic compound and (d) a divalent metal amine complex compound represented by the general formula:

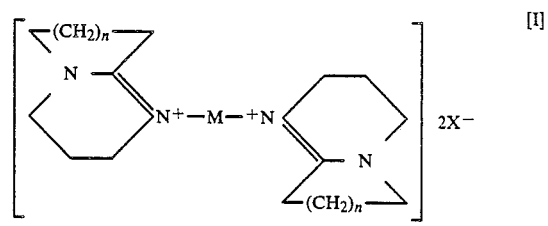

wherein M is a divalent metal, X is an anionic group and n is 3 or 5.

The fluorine-containing elastomer to be vulcanized is a highly fluorinated elastomer-like copolymer, for example, a copolymer of vinylidene fluoride with other fluorine-containing olefin, and includes, for example, copolymers of vinylidene fluoride with at least one of hexafluoropropene, pentafluoropropene, trifluoroethylene, trifluorochloroethylene, tetrafluoroethylene, vinyl fluoride, perfluoroacrylate ester, perfluoroalkyl acrylate, perfluoro(methyl vinyl ether), perfluoro(propyl vinyl ether), etc., preferably binary copolymer of vinylidene fluoride-hexafluoropropene and ternary copolymer (terpolymer) of vinylidene fluoride-tetrafluoroethylene-hexafluoropropene.

As the divalent metal oxide and hydroxide as an acid receptor, about 1 to about 40 parts by weight, preferably about 3 to about 15 parts by weight, of at least one of oxide and hydroxide of a divalent metal such as magnesium, calcium, barium, lead and zinc is used per 100 parts by weight of the fluorine-containing elastomer.

The polyhydroxyaromatic compound for use as a cross-linking agent includes, for example, 2,2-bis(4-hydroxyphenyl) propane [bisphenol A], 2,2-bis(4-hydroxyphenyl)perfluoro-propane [bisphenol AF], hydroquone, catechol, resorcinol, 4,4'-dihydroxydiphenyl, 4,4'-dihydroxydiphenylmethane, 4,4'-dihydroxydiphenylsulfone, 2,2-bis(4-hydroxyphenyl)butane, etc., preferably bisphenol A, bisphenol AF and hydroquinone. They may be in the form of an alkali metal salt or alkaline earth metal salt. The crosslinking agent is used in an amount of about 0.5 to about 10 parts by weight, preferably about 0.5 to about 6 parts by weight, per 100 parts by weight of the fluorine-containing elastomer. With less than about 0.5 parts by weight of the crosslinking agent, no satisfactory crosslinking density can be obtained, whereas with more than about 10 parts by weight thereof, the crosslinking density becomes too high, and the rubber-like elasticity is often lost.

The divalent metal amine complex compound represented by said general formula [I] includes, for example, complexes of 1,8-diazabicyclo[5,4,0]undec-7-ene (DBU) with magnesium chloride, nickel chloride, zinc chloride, etc., a complex of 1,5-diazabicyclo [4,3,0]non-5-ene (DBN) with magnesium chloride, etc. As the other divalent metal, cobalt, lead, iron, tin, cadmium, calcium, etc. can be used. The anionic group includes, for example, halide, hydroxylate, alkoxylate, carboxylate, phenoxide, sulfonate, sulfate, sulfite, carbonate, nitrate, etc.

The divalent metal amine complex compound can be readily obtained by heating DBU or DBN and said divalent metal compound in the presence or absence of a solvent such as toluene, methanol, acetone, etc. In the present composition, about 0.05 to about 5 parts by weight, preferably about 0.05 to about 2 parts by weight, of the divalent metal amine complex compound is used per 100 parts by weight of the fluorine-containing elastomer. With less than about 0.05 parts by weight of the divalent metal amine complex compound, the crosslinkability becomes poor, whereas with more than about 5 parts by weight thereof, the properties of the resulting vulcanized product will be considerably adversely influenced.

The components of the vulcanization system can be blended and kneaded as such or diluted and dispersed with carbon black, silica, clay, talc, diatomaceous earth, barium sulfate, etc., or can be used as a master batch dispersion with the fluorine-containing elastomer. The present composition can further contain well known filler, reinforcing agent, plasticizer, lubricant, processing agent, pigment, etc., if desired.

Vulcanization is generally carried out by mixing the fluorine-containing elastomer with the components of the vulcanization system and said various additives according to the ordinary mixing procedure, such as roll mixing, kneader mixing, bambury mixing, solution mixing, etc., followed by heating. Generally, primary vulcanization is carvied out by heating at about 140° to about 200° C. for about 2 about 120 minutes and secondary vulcanization is carried out by heating at about 150° to about 250° C. for 0 to about 30 hours.

The present fluorine-containing elastomer composition has a good stock storage stability and a considerably longer scorch time than that of the conventional vulcanization system and can produce a vulcanized product with improved vulcanized product properties, particularly in the tensile strength and elongation, and also with much improved compression set.

The conventional vulcanization promoter based on the quaternary ammonium salt compound has such problems as high hygroscopicity and deliquescency, whereas the divalent metal amine complex compound used in the present invention shows neither hygroscopicity nor deliquescency even through it is a kind of quaternary ammonium salt compounds, and thus is distinguished in handling.

The present invention will be described in detail below, referring to Examples.

REFERENCE EXAMPLE 1

(Synthesis of DBU/MgCl$_2$ complex)

152.2 g (1.0 mole) of DBU and 47.6 g (0.5 moles) of anhydrous MgCl$_2$ were refluxed in 300 g of methanol with heating for 8 hours, and then cooled. The deposited crystals were recovered therefrom by filtration, washed with acetone and dried, whereby 145.2 g of DBU/MgCl$_2$ complex compound was obtained (yield: 72.7%).

REFERENCE EXAMPLE 2

(Synthesis of DBU/NiCl$_2$ complex)

152.2 g (1.0 mole) of DBU and 64.8 g (0.5 moles) of anhydrous NiCl$_2$ were subjected to reaction at 180° C. for 4 hours in the absence of a solvent, and the reaction mixture was poured into acetone. The deposited crystals were ricovered therefrom by filtration, washed with acetone and dried, whereby 120.5 g of DBU/NiCl$_2$ complex compound was obtained (yield: 55.5%).

REFERENCE EXAMPLE 3

(Synthesis of DBN/MgCl$_2$ complex)

124.2 g (1.0 mole) of DBN and 47.6 g (0.5 moles) of anhydrous MgCl$_2$ were refluxed in 250 g of acetone with heating for 10 hours, and then cooled. The deposited crystals were recovered therefrom by filtration, washed with acetone and dried, whereby 129.0 g of DBN/MgCl$_2$ complex compound was obtained (yield: 75.1%).

EXAMPLES 1-3 AND COMPARATIVE EXAMPLES 1-2

Copolymer obtained by copolymerization of vinylidene fluoride with hexafluoropropene in the presence of ammonium persulfate as a polymerization initiator in an aqueous medium, using acetone as a chain transfer agent [molar rario of comonomer components=78:22; solution viscosity $\eta sp/c$ 0.98 (35° C. in acetone, c=1.0), polymer Mooney viscosity $ML_{1+10}$ 53 (121° C.); fluorine-containing elastomer A] was subjected to blending in formulations shown in Table 1, kneaded through 8-inch mixing rolls to prepare fluorine-containing elastomer compositions. Mixing ratio in the formulation is by weight.

TABLE 1

| Formulation | Example | | | Comp. Ex. | |
|---|---|---|---|---|---|
| | 1 | 2 | 3 | 1 | 2 |
| Fluorine-containing elastomer A | 100 | 100 | 100 | 100 | 100 |
| MT carbon black | 25 | 25 | 25 | 25 | 25 |
| Calcium hydroxide | 5 | 5 | 5 | 5 | 5 |
| Magnesium oxide | 3 | 3 | 3 | 3 | 3 |
| Bisphenol AF | 2 | 2 | 2 | 2.2 | 2 |
| DBU/MgCl$_2$ complex | 0.5 | | | | |
| DBU/NiCl$_2$ complex | | 0.2 | | | |
| DBN/MgCl$_2$ complex | | | 0.15 | | |
| Benzyl triphenyl phosphonium chloride | | | | 0.5 | |
| 8-benzyl-1,8-diazabicyclo [5,4,0]undec-7-enium chloride | | | | | 0.4 |

The thus obtained, various fluorine-containing elastomer compostions were subjected to determination of Mooney viscosity and scorch time (time until the Mooney viscosity reaches a value of the minimum value +5, serving as an index for the stock storage stability and processing stability) at a measurement tempreture 121° C.

Furthermore, the compositions were press vulcanized at 180° C. for 5 minutes and then subjected to secondary vulcanization for 22 hours in an oven at 230° C., and physical properties of the thus obtained vulcanized products were measured according to JIS K-6301 procedure. The compression set was measured by preparing O-rings of P-24 by vulcanization under the same conditions as above and subjecting then to 25% compression.

Results of the measurements are shown in the following table 2.

TABLE 2

|  | Example | | | Comp. Ex. | |
|---|---|---|---|---|---|
|  | 1 | 2 | 3 | 1 | 2 |
| Measurements | | | | | |
| Mooney viscosity $ML_{1+4}$ (121° C.) | 71 | 71 | 71 | 72 | 72 |
| Scorch time $\Delta 5$(121° C.) (min.) | 25.9 | 27.8 | 30.3 | 19.8 | 18.5 |
| Physical properties of vulcanized products (180° C., pressing for 5 min. +230° C., vulcanization in oven for 22 hrs.) | | | | | |
| Hardness (JIS A) | 74 | 74 | 73 | 75 | 75 |
| 100% Modulus (Kg/cm$^2$) | 53 | 64 | 48 | 55 | 54 |
| Tensile strength (Kg/cm$^2$) | 142 | 162 | 144 | 127 | 131 |
| Elongation (%) | 225 | 205 | 210 | 195 | 190 |
| Compression set | | | | | |
| 175° C., 22 hrs. (%) | 5 | 5 | 6 | 8 | |
| 200° C., 70 hrs. (%) | 15 | 14 | 16 | 25 | |

EXAMPLES 4-5 AND COMPARATIVE EXAMPLE 3

Terpolymer of vinylidene fluoride-tetrafluoroethylene -hexafluoropropene (molar ratio=41:41:18) [polymer Mooney viscosity $ML_{1+10}$ 96(121° C.); fluorine-containing elastomer B] was subjected to blending in formulations shown in Table 3, kneaded through 8-inch mixing rolls to prepare fluorine-containg elastomer compositions.

The thus obtained fluorine-containing elastomer compositions were subjected to the same measurements as in Examples 1-3, and the results are shown in Table 3.

TABLE 3

| [Formulation] | Example 4 | Example 5 | Comp. Ex. 3 |
|---|---|---|---|
| Fluorine-containing elastomer B | 100 | 100 | 100 |
| MT carbon black | 20 | 20 | 20 |
| Calcium hydroxide | 5 | 5 | 5 |
| Magnesium oxide | 3 | 3 | 3 |
| Hydroquinone | 1.2 | 1.2 | 1.2 |
| DBU/MgCl$_2$ complex | 0.15 | | |
| DBU/NiCl$_2$ complex | | 0.15 | |
| 1-benzyl pyridinium chloride | | | 0.5 |
| 4-dimethylamino pyridine | | | 0.04 |
| [Measurements] | | | |
| Scorch time $\Delta 5$(121° C.,) (min.) | 37.0 | 28.6 | 22.3 |
| Physical properties of vulcanized products (180° C., pressing for 5 min. +230° C., vulcanization in oven for 22 hrs.) | | | |
| Hardness (JIS A) | 74 | 74 | 74 |
| 100% Modulus (Kg/cm$^2$) | 68 | 65 | 70 |
| Tensile strength (Kg/cm$^2$) | 167 | 158 | 153 |
| Elongation (%) | 210 | 195 | 165 |
| Compression set at 200° C. [22 hrs] (%) | 12 | 12 | 18 |

What is claimed is:

1. A fluorine-containing elastomer composition, which comprises (a) 100 parts by weight of a fluorine-containing elastomer, (b) about 1 to about 40 parts by weight of at least one of divalent metal oxide and hydroxide, (c) about 0.5 to about 10 parts by weight of a polyhydroxyaromatic compound, and (d) about 0.05 to about 5 parts by weight of divalent metal amine complex compound represented by the following general formula [I]:

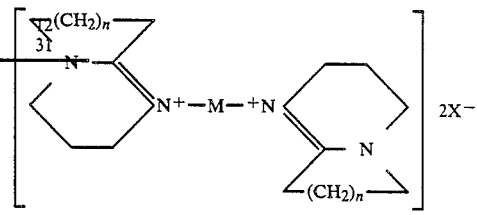

wherein M is a divalent metal, X is an anionic group and n is 3 or 5.

2. A fluorine-containing elastomer composition according to claim 1, wherein the fluorine-containing elastomer is a copolymer of vinylidene fluoride with other fluorine-containing olefin.

3. A fluorine-containing elastomer composition according to claim 2, wherein the copolymer is a copolymer of vinylidene fluoride-hexafluoropropene.

4. A fluorine-containing elastomer composition according to claim 2, wherein the copolymer is a terpolymer of vinylidene fluoride-tetrafluoroethylene-hexafluoropropene.

5. A fluorine-containing elastomer composition according to claim 1, wherein the divalent metal amine complex represented by the general formula [I] is a complex of 1,8-diazabicyclo [5,4,0]undec-7-ene and a divalent metal salt.

6. A fluorine-containing elastomer composition according to claim 1, wherein the divalent metal amine complex represented by the general formula [I] is a complex of 1,5-diazabicyclo [4,3,0]non-5-ene and a divalent metal salt.

7. A fluorine-containing elastomer compositon according to claim 5, wherein the divalent metal salt is a chloride.

8. A fluorine-containing elastomer composition according to claim 7, wherein the chloride is magnesium chloride, nickel or zinc chloride.

* * * * *